United States Patent Office 3,752,800
Patented Aug. 14, 1973

3,752,800
PROCESS FOR THE MANUFACTURE OF
A PYROGLUTAMYLPEPTIDE
Hans Wissmann, Bad Soden, Taunus, Wolfgang Konig,
Langenhain, Taunus, and Rolf Geiger, Frankfurt am
Main, Germany, assignors to Farbwerke Hoechst Aktiengesellschaft vormals Meister Lucius & Bruning,
Frankfurt am Main, Germany
No Drawing. Filed July 6, 1971, Ser. No. 160,211
Claims priority, application Germany, July 7, 1970,
P 20 33 600.9
Int. Cl. C07c *103/52;* C07g *7/00;* C08h *1/00*
U.S. Cl. 260—112.5                                    1 Claim

ABSTRACT OF THE DISCLOSURE

Methods of making L-pyroglutamyl-L-histidyl-L-proline-amide, useful in the treatment of hypothyreosis:
(1) by reacting an $N^\alpha,N^\gamma$-protected glutamine with L-histidyl - L - proline-4,4'-dimethoxybenzhydrylamide; or
(2) by reacting an $N^\alpha$-protected-$N^\gamma$-4,4'-dimethoxybenzhydryl-L-glutamyl - L - histidine with L-proline amide or L-proline-4,4'-dimethoxybenzhydrylamide.

Protective groups are removed and the reaction product is cyclized by treatment with trifluoroacetic acid after catalytic hydrogenation of any benzyloxycarbonyl protective groups present.

---

The present invention relates to methods for making L-pyroglutamyl-L-histidyl-L-proline-amide, and to intermediate products.

Peptides of pyroglutamic acid are often difficult to obtain in pure form. This applies especially to L-pyroglutamyl-L-histidyl-L-proline-amide which according to Biochem. and Biophys. Res. Communc. 37, 705 (1969), is identical with the thyrotropin releasing factor (TRF). The synthesis of this tripeptide (cf. Helv. Chim. Acta 53, 63 (1970), is difficult because all intermediate products, starting from proline-amide and pyroglutamic acid, are water-soluble and therefore difficult to handle and to purify.

Now, it has been found that, unexpectedly, pyroglutamyl-peptides are formed with very good yields from glutamine-peptides upon treatment with boiling trifluoroacetic acid. When the amide groups of glutamine and/or of proline-amide have been previously blocked with protective groups which can be easily split off by trifluoroacetic acid, for example the 4,4'-dimethoxy-benzhydryl group, the 2,4-dimethoxy-benzyl group, the 2,4,6-trimethoxy-benzyl group or the xanthyl group, sparingly water-soluble intermediate products and partly also intermediate products that are soluble in ethyl acetate are obtained which can easily be purified.

Thus, the present invention provides a process for the manufacture of L-pyroglutamyl-L-histidyl-L-proline-amide, wherein (a) A compound of the Formula I

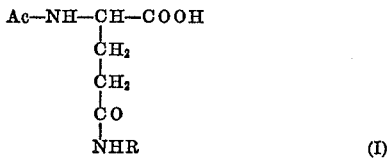

(I)

in which R represents hydrogen, the 4,4'-dimethoxy-benzhydryl group (Mbh) or the 2,4-dimethoxy-benzyl-, 2,4,6-trimethoxybenzyl- or xanthyl-group, and Ac represents the tert.butyloxy-carbonyl-, the benzyloxy-carbonyl-, the adamantyloxy-carbonyl- or the isobornyloxy-carbonyl group, is reacted according to the condensation methods usually employed in peptide chemistry, preferably by means of dicyclohexyl-carbodiimide in the presence of 1-hydroxy-benzotriazole or 3 - hydroxy-4-oxo-3,4-dihydro-1,2,3-benzotriazine, or in the form of an activated ester thereof, for example the p-nitrophenyl ester, the N-hydroxy-succinimide ester, or the 1-hydroxy-benzotriazole ester, with a compound of the Formula II

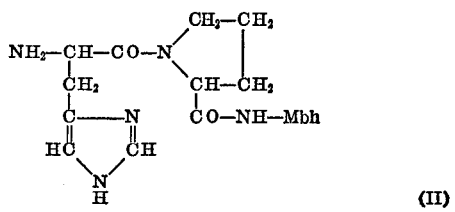

(II)

In a further synthesis,
(b) The compound of the Formula III

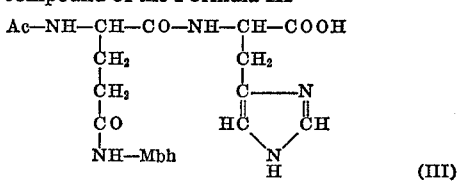

(III)

in which Ac has the meaning given above, is reacted according to the condensation methods usually employed in peptide chemistry, preferably by means of dicyclohexyl-carbodiimide, in the presence of 1-hydroxy-benzotriazole, N-hydroxy-succinimide or 3-hydroxy-4-oxo-3,4-dihydro-1,2,3-benzotriazine, with L-proline-amide or L-proline-4,4'-dimethoxybenzhydryl-amide, and the compounds of the Formula IV

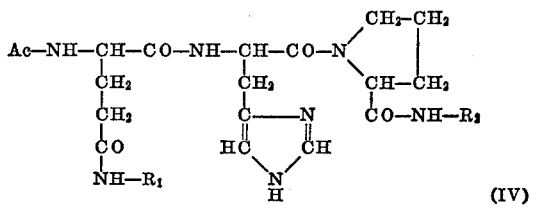

(IV)

thus obtained, in which $R_1$ and $R_2$ have the same meaning as R, but $R_1$ and $R_2$ cannot simultaneously represent hydrogen, are heated under reflux with anisole- or phenol-containing trifluoroacetic acid. If necessary (if Ac=the benzyloxy-carbonyl group), the compounds obtained are hydrogenated catalytically prior to the treatment with trifluoroacetic acid/anisole.

The L-pyroglutamyl-L-histidyl-proline-amide prepared according to the invention is already chromatographically pure without any other purification and has a high TRF activity.

These processes for the manufacture of L-pyroglutamyl-L-histidyl-L-proline-amide are especially advantageous, because sparingly water-soluble intermediate products are always formed, which considerably facilitate isolation and purification.

As an intermediate product for the method a), the L-histidyl-L-proline-4,4'-dimethoxybenzhydryl amide of Formula II is of special importance; it can be prepared by catalytic hydrogenation of benzyloxycarbonyl-L-histidyl-L-proline-4,4'-dimethoxybenzhydryl amide, which can be easily purified. This compound of Formula II can be reacted with L-glutamine derivatives of the general Formula I to form tripeptide derivatives of the General Formula IV ($R_1$, $R_2$=Mbh or $R_1$=H, $R_2$=Mbh). The use of derivatives of the General Formula I in which R represents the Mbh radical is especially advantageous. With these derivatives, because of the protection of the amide function, also other methods of peptide synthesis may be used, for example the anhydride or inamine method or the synthesis with Woodward's reagent K, without dehydration of the amide group to a cyano group or the formation of α-amino-glutaramide derivatives, as is often the case with glutamine derivatives in which the amide group is not protected.

$N^\alpha$ - benzyloxycarbonyl-$N^\gamma$-4,4'-dimethoxybenzhydryl-L-glutamine can be prepared, for example, according to the method described in Proc. 9th Europ. Peptide Symp., North Holland Publishing Comp., Amsterdam (1968), page 89, by the reaction of benzyloxycarbonyl-L-glutamine with 4,4'-dimethoxybenzhydryl in glacial acetic acid under catalysis with $H_2SO_4$. If the benzyloxycarbonyl group is split off from this compound by hydrogenolysis and the reaction product is acylated with tert. butyloxycarbonyl-azide, adamantyloxy-carbonyl chloride or isobornyloxycarbonyl chloride, further acyl derivatives of the General Formula I (R=Mbh) are obtained.

In the reaction of substances of the General Formula I (R=H) with L-histidyl-L-proline-4,4'-dimethoxybenzhydrylamide for the synthesis of compounds of the General Formula IV ($R_1$=H; $R_2$=Mbh), the former are advantageously used in the form of their activated esters, for example p-nitrophenyl esters. The substances of the General Formula I (R=H) can also be reacted using Woodward's reagent K or dicyclohexylcarbodiimide in the presence of 1-hydroxybenzotriazole (Chem. Ber. 103 (1970), page 788) or 3-hydroxy-4-oxo-3,4-dihydro-1,2,3-benzotriazine with L-histidyl-L-proline-4,4'-dimethoxybenzhydrylamide to form compounds of the General Formula IV ($R_1$=H; $R_2$=Mbh). As solvents, dimethylformamide and dimethylacetamide are preferably used.

In method (b) for preparing compounds of the General Formula IV, compounds of the General Formula III are used. The hybrid ion $N^\alpha$-benzyloxycarbonyl-$N^\gamma$-4,4'-dimethoxy-benzhydryl-L-glutamyl-L-histidine, which is sparingly soluble in water and organic solvents, is prepared by hydrolysis of the corresponding methyl ester. Substances of the General Formula III are reacted with L-proline-amide to form compounds of the General Formula IV ($R_1$=Mbh; $R_2$=H) and with L-proline-4,4'-dimethoxybenzhydrylamide to form compounds of the Formula IV in which $R_1$ and $R_2$ are Mbh. The peptide linkage is effected with the aid of dicyclohexyl-carbodiimide in the presence of 1-hydroxybenzotriazole, N-hydroxy-succinimide or 3-hydroxy-4-oxo-3,4-dihydro-1,2,3-benzotriazine. The condensation reactions are advantageously started at —10° C. to 0° C. and are completed at room temperature. As solvents, dimethylformamide and dimethylacetamide are preferably used.

For splitting off the protective groups and simultaneous cyclization of the glutaminyl radical, the compounds of the General Formula IV are boiled for 30–90 minutes in trifluoroacetic acid which contains about 10% of anisole or phenol. The whole is then evaporated to dryness under reduced pressure and in order to remove any adhering trifluoroacetic acid it is filtered over a basic ion exchanger, for example Amberlite IR–45, IRA–40 or Serdolite blue. The filtrate is then concentrated under reduced pressure or freeze-dried.

The L-pyroglutamyl-L-histidyl-L-proline-amide prepared according to the process of the invention is pure and is used in medicine for hypophysis function tests and for the therapy of hypothyroses.

The following examples illustrate the invention:

L - PYROGLUTAMYL - L - HISTIDYL - L - PROLIN-AMIDE (IV) ACCORDING TO METHODS (b):

(1) From Z-Glu(Mbh)-His-Pro-$NH_2$ (IV, $R_1$=Mbh; $R_2$=H; Z=benzyloxycarbonyl)

(a) Z-Glu(Mbh)-His-OMe: 16.5 g. of Z-Glu(Mbh)—OH (I, R=Mbh), 7.85 g. of H-His-OMe·2HCl, 8.8 g. of 1-hydroxybenzotriazole and 9.0 ml. of triethylamine were dissolved in 220 ml. of chloroform. 7.2 g. of dicyclohexyl-carbodiimide in 12 ml. of chloroform were added at 0° C. and the whole was stirred for 3 hours at room temperature. The chloroform was then removed by distillation notwithstanding the precipitate and the residue was dissolved in 60 ml. of warm dimethylformamide. Undissolved dicyclohexyl-urea was removed by filtration and the solution was poured in 400 ml. of water. The jelly-like precipitate was filtered off with suction, washed with water and ether and dried at the air. Yield: 21.3 g.

(b) Z-Glu(Mbh)-His-OH (III): 20.5 g. of Z-Glu(Mbh)-His-OMe were dissolved in a mixture of 40 ml. of methanol, 65 ml. of water and 160 ml. of dioxane and hydrolyzed at a pH-value of 12.7 under addition of 1 N-NaOH and control of the pH-value by means of an autotitrator. 45.2 ml. of 1 N-NaOH. 45.2 ml. of 1 N-HCl were then added, the whole was concentrated under reduced pressure to a smaller volume and combined with a large amount of water. The precipitate was boiled twice with ethanol. Yield: 11.5 g.; melting point 186–189° C.

(c) Z-Glu(Mbh)-His-Pro-$NH_2$ (IV): 19.2 ml. of N-ethylmorpholine and, at 0° C., a cold solution of 31 g. of dicyclohexyl-carbodiimide in 150 ml. of dimethylformamide, were added to a solution of 96.5 g. of Z-Glu(Mbh)-His-OH in 1 liter of dimethylformamide. The whole was stirred for 1 hour at 0° C. and overnight at room temperature. The precipitate that separated was filtered off with suction the next day and the filtrate was concentrated under reduced pressure. The residue was dissolved in 1.5 liters of ethyl acetate to which a small amount of water and alcohol had been added and washed with saturated sodium bicarbonate solution and water. Drying was effected over $NaSO_4$ and the ethyl acetate solution was concentrated under reduced pressure. The residue was triturated with ether and filtered off with suction. Crude yield: 97.2 g. For purification, the crude product obtained was boiled twice with ethyl acetate. Yield: 73 g.

$[\alpha]_D$= —23.1° (c.=1, in 90% acetic acid).

(d) L-pyroglutamyl - L - histidyl-L-prolin-amide: 51.8 g. of Z-Glu(Mbh)-His-Pro-$NH_2$ were dissolved in 520 ml. of 90% acetic acid and hydrogenated for 3 hours using a Pd-catalyst. The catalyst was removed by filtration with suction and the filtrate was concentrated under reduced pressure. The residue was triturated several times with ether and boiled for 90 minutes under reflux in 500 ml. of a mixture of trifluoroacetic acid and anisole (9:1). The trifluoroacetic acid was removed by distillation under reduced pressure. The residue was triturated with ether and filtered off with suction. The substance was dissolved in 120 ml. of water and passed through a column of 400 ml. of Amberlite IR–45. Elution was effected with water. The eluate was concentrated to a small volume, heated with a small amount of active charcoal, filtered with suction through a clarifying filter and freeze-dried. Yield: 17.0 g. (67%).

$[\alpha]_3$= —63° (c.=1, in water).

(2) From Z-Glu(Mbh)-His-Pro-NH-Mbh (IV, $R_1$, $R_2$=Mbh) according to methods (a) and (b)

(a) Z-Pro-NH-Mbh: 1 ml. of concentrated $H_2SO_4$ was added to a solution of 25 g. (0.2 mole) of 4,4'-dimethoxybenzhydrol in 200 ml. of glacial acetic acid and the whole was allowed to stand for 2 days at room temperature. An An oil, which soon crystallized, was precipitated by addition of 800 ml. of water. The precipitate was filtered off with suction, washed with water and dissolved in ethyl acetate. The ethyl acetate solution was washed with a $NaHCO_3$ solution and water, dried over sodium sulfate and concentrated under reduced pressure. The residue was triturated with ether and filtered off with suction. Yield: 38.1 g. (80%); melting point 123–126° C. A small amount of Z-Pro-$NH_2$ could be detected by thin-layer chromatography. For purification, the product was precipitated from a mixture of ethanol and water. Yield: 36.65 g. (77%); melting point 119–122° C.

$[\alpha]_D$= —5.1° (c.=1, dimethylacetamide).

$C_{28}H_{30}N_2O_5$ (474.6).—Calcd. (percent): C, 70.88; H, 6.34; N, 5.92. Found (percent): C, 70.8; H, 6.1; N, 5.9.

(b) H-Pro-NH-Mbh: Hydrogen was passed through a solution of 29.2 g. (61.6 mmoles) of Z-Pro-NH-Mbh in 200 ml. of methanol to which a small amount of

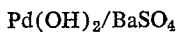

catalyst had been added, while maintaining the pH-value at 4.5 by dropwise addition of 1 N-methanolic hydrochloric acid with the aid of an autotitrator. After the hydrogenation, the whole was filtered with suction through a silica gel filter, the filtrate was concentrated and the residue was distributed in a mixture of 60 ml. of 2 N-soda solution and 150 ml. of ethyl acetate. The ethyl acetate solution was dried over sodium sulfate and concentrated. The residue crystallized upon trituration with petroleum ether. Yield: 18.8 g. (90%); melting point 93–98° C.

$[\alpha]_D = -30.7°$ (c.=1, dimethylacetamide).
$C_{20}H_{24}N_2O_3$ (340.4).—Calcd. (percent): C, 70.57; H, 7.10; N, 8.23. Found (percent): C, 70.0; H, 7.0; N, 8.6.

(c) Z-His-Pro-NH-Mbh (II): 75 ml. of ethyl acetate were added to a solution cooled to −5° C. of 13.6 g. (45 mmoles) of Z-His-NHNH$_2$ in 110 ml. of 1 N-HCl and, while stirring, an ice-cold solution of 3.15 g. of NaNO$_2$ in a small amount of water was dropped in. After 5 minutes, a saturated soda solution cooled to 0° C. was added until the reaction mixture showed an alkaline reaction. The ethyl acetate phase was separated in a pre-cooled separating funnel and the aqueous phase was extracted once again with cold ethyl acetate. The combined ethyl acetate phases were dried at −5° C. over sodium sulfate and combined at 0° C. with 6.8 g. (20 mmoles) of H-Pro-NH-Mbh. The whole was allowed to stand overnight in a refrigerator and the n ext day precipitation was effected with petroleum ether. The mixture of solvents was decanted from the substance which had separated in the form of a grease. It was then triturated with ether to yield an amorphous substance. For purification, the substance was chromatographed in tetrahydrofurane over about 40 g. of basic Al$_2$O$_3$ (Woelm, activity degree I). Yield: 10.5 (86%).

$[\alpha]_D = -31.6°$ (c.=1, dimethylacetamide).
$C_{34}H_{37}N_5O_6 \cdot 1H_2O$ (629.7).—Calcd. (percent): C, 64.88; H, 6.25; N, 11.12. Found (percent): C, 65.0; H, 6.3; N, 11.2.

(d) Z-Glu(Mbh)-His - Pro - NH - Mbh (IV, R$_1$, R$_2$=Mbh) according to method (a):

(α) Hydrogen was passed through the solution of 6.30 g. (10 mmoles) of Z-His-Pro-NH-Mbh·1H$_2$O (II) in 100 ml. of methanol to which a small amount of a

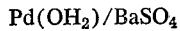

catalyst had been added, while maintaining the pH at 4.5 by dropwise addition of 1 N-methanolic hydrogen chloride with the aid of an autotitrator. When the hydrogenation was completed, 12.7 ml. of 1 N-methanolic hydrogen chloride had been taken up. The catalyst was removed by filtration with suction and the filtrate was concentrated. The residue was dissolved in 20 ml. of dimethylformamide. 1.63 ml. of N-ethylmorpholine (1.27 mmole), 2.7 g. (20 mmoles) of 1-hydroxybenzotriazole and 5.05 g. (10 mmoles) of Z-Glu(Mbh)-OH (I, R=Mbh) were added. The whole was cooled to 0° C., a solution of 2.1 g. of DCC in 5 ml. of dimethylformamide was added, the mixture was stirred for 1 hour at 0° C. and for 1 hour at room temperature, the precipitate that had formed was filtered off with suction and the filtrate was concentrated. The residue was dispersed between ethyl acetate and a 2 N-soda solution, washed with water, dried and concentrated. The residue was triturated with ether and filtered off with suction. An amorphous substance had formed. Yield: 8.25 g. (87%). For purification, the substance was chromatographed in tetrahydrofurane over about 25 g. of basic Al$_2$O$_3$ (Woelm, activity degree I). Yield: 6.35 g. (67%). $[\alpha]_D = -21.4°$ (c.=1, dimethylacetamide).

$C_{53}H_{57}N_7O_{10} \cdot 1H_2O$ (970.1).—Calcd. (percent): C, 65.60; H, 6.13; N, 10.12. Found (percent): C, 66.1; H, 6.3; N, 10.0—according to method (b).

(β) 6.45 g. (10 mmoles) of Z-Glu(Mbh)-His-OH (III) were added to a solution of 3.4 g. (10 mmoles) of H-Pro-NH-Mbh and 2.7 g. (20 mmoles) of 1-hydroxybenzotriazole in 40 ml. of dimethylformamide and at 0° C. a cold solution of 2.2 g. of DCC in dimethylformamide was added. The whole was stirred for 1 hour at 0° C. A fine jelly-like precipitate formed which dissolved again within one hour at room temperature upon addition of about 20 ml. of dimethylformamide. Insoluble matter was filtered off and the filtrate was concentrated under reduced pressure. The residue was dissolved in ethyl acetate and the ethyl acetate solution was shaken twice with 2 N-soda solution and once with a saturated NaCl solution, dried over NaSO$_4$ and concentrated. The residue was triturated with ether. 9 g. of an amorphous substance (94.5%) had formed. For purification, the product was chromatographed in tetrahydrofurane over basic Al$_2$O$_3$ (Woelm, activity degree I). Yield: 7.4 g. (78%). $[\alpha]_D = -22.0°$ (c.=1, dimethylacetamide).

(e) L-pyroglutamyl - L - histidyl-L-prolinamide: 2.04 g. (2.1 mmoles) of Z-Glu(Mbh)-His-Pro-NH-Mbh were boiled under reflux for 1.5–2 hours in 10 ml. of trifluoroacetic acid. The reaction mixture was then concentrated and the residue was triturated with ether and filtered off with suction. The slightly hygroscopic substance was dissolved in water. The aqueous solution was clarified with a small amount of active charcoal, passed over a basic exchanger (for example Serdolit blue) and freeze-dried. Yield: 683 mg. (88%) of amorphous substance.

$[\alpha]_D = -58.5°$ (c.=1, H$_2$O).
$C_{16}H_{22}N_6O_4 \cdot 1H_2O$ (380.4).—Calcd. (percent): C, 50.5; H, 6.35; N, 22.1. Found (percent): C, 50.0; H, 6.0; N, 21.8.

(3) From Z-Glu-His-Pro-NH-Mbh (IV, R$_1$=H; R$_2$=Mbh) according to method (a)

(a) Z-Glu-His-Pro-NH-Mbh: Hydrogen was passed through a solution of 6.30 g. (10 mmoles) of Z-His-Pro-N-Mbh·1H$_2$O (II) in 100 ml. of methanol, to which a small amount of Pd(OH$_2$)/BaSO$_4$ catalyst had been added, while maintaining the pH-value at 4.0 by dropwise addition of 0.93 N-methanolic hydrogen chloride with the aid of an autotitrator. When the hydrogenation was completed, 17 ml. of 0.93 N-methanolic hydrogen chloride were consumed. The catalyst was removed by filtration with suction and the filtrate was concentrated. The residue was dissolved in 30 ml. of dimethylformamide. 2.04 ml. (15.8 mmoles) of N-ethylmorpholine, 2.7 g. (20 mmoles) of 1-hydroxy-benzotriazole and 2.8 g. (10 mmoles) of Z-Glu-OH (I, R=H) were then added. The mixture was cooled to 0° C. and combined with a solution of 2.1 g. of DDC in 5 ml. of dimethylformamide, stirred for 1 hour at 0° C. and for 1 hour at room temperature, the precipitate that formed was filtered off with suction and the filtrate was concentrated. The residue was dispersed between ethyl acetate, to which a small amount of dimethylformamide had been added, and 2 N-soda-solution. The ethyl acetate phase was extracted with NaCl-solution, dried over sodium sulfate and concentrated. The residue was triturated with ether and dissolved and reprecipitated from a mixture of tetrahydrofurane and ether. 4.15 g. (56%) of product were obtained.

$[\alpha]_D = -33.5°$ (c.=1, dimethylacetamide).

$C_{39}H_{45}N_7O_8 \cdot 0.5H_2O$ (748.8).—Calcd. (percent): C, 62.52; H, 6.19; N, 13.1. Found (percent): C, 62.6; H, 6.2; N, 12.9.

(b) L-pyroglutamyl - L - histidyl-L-prolinamide: 1 g. (1.34 mmoles) of Z-Glu-His-Pro-NH-Mbh was boiled with 0.5 ml. of anisole for 1.5–2 hours under reflux in 5 ml. of trifluoroacetic acid. Working up was effected as usual. Yield: 366 mg. (72%). In thin-layer chromatography, the product was found to be identical with L-pyroglutamyl-L-histidyl-L-proline amide.

(4) From Boc-Glu-His-Pro-NH-Mbh (Boc=tert.-butyloxycarbonyl) according to method (a)(β)

(a) Boc-Glu-His-Pro-NH-Mbh: Hydrogen was passed through a solution of 5.75 g. (9.13 mmoles) of Z-His-Pro-NH-Mbh·1H₂O (II) in 100 ml. of methanol, to which a small amount of Pd(OH₂)/BaSO₄ had been added, while maintaining the pH-value at 4 by dropwise addition of 0.93 N-methanolic hydrogen chloride with the aid of an autotitrator. When the hydrogenation was completed, 15.5 ml. (14.4 mmoles) were consumed. The catalyst was removed by filtration with suction and the filtrate was concentrated. The residue was dissolved in 20 ml. of dimethylformamide. 1.85 ml. (14.4 mmoles) of N-ethylmorpholine and 3.5 g. of Boc-Glu-ONp were added and the whole was allowed to stand for 3 days at room temperature. The dimethylformamide was removed by distillation under a high vacuum and the residue was dispersed between ethyl acetate and 2 N-soda solution. The ethyl acetate phase was extracted once with 2 N-soda solution and twice with water, dried over sodium sulfate and concentrated. The residue was triturated with ether. Yield: 5.55 g. (86%). For purification, the product could be chromatographed in tetrahydrofurane over basic Al₂O₃.

$[α]_D = -36.9°$ (c.=1, dimethylacetamide).

(b) L-pyroglutamyl - L - histidyl-L-prolinamide: 563.6 mg. (0.799 mmole) of Boc-Glu-His-Pro-NH-Mbh and 0.5 ml. of anisole were boiled under reflux for 1 hour in 5 ml. of trifluoroacetic acid. Working up was effected as usual. Yield: 225 mg. (74%). In thin-layer chromatography, the product was found to be identical with L-pyroglutamyl-L-histidyl-L-prolineamide.

We claim:

1. The method of making L-pyroglutamyl-L-histidyl-L-proline-amide from protected L-glutamyl-L-histidyl-L-proline-amide of the formula

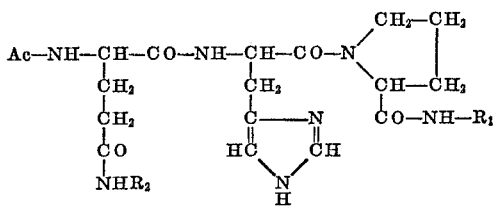

wherein R₁ is hydrogen or 4,4'-dimethoxybenzhydryl and R₂ is hydrogen, 4,4'-dimethoxybenzhydryl, 2,4-dimethoxybenzyl, 2,4,6-trimethoxybenzyl, or xanthyl, and Ac is t-butyloxycarbonyl, benzyloxycarbonyl, adamantyloxycarbonyl, or isobornyloxycarbonyl, but not both R₁ and R₂ are hydrogen, which comprises refluxing said L,L,L-compound in a mixture of trifluoroacetic acid with anisole or phenol.

References Cited

Folkers et al., Biochem. Biophys. Res. Comm., 39, 110 (1970).
Boler et al., J. Med. Chem., 14, 475 (1971).
Enzmann et al., J. Med. Chem., 14, 469 (1971).
Chang et al., J. Med. Chem., 14, 484 (1971).
Fieser, L. F. and Fieser, M., Reagents for Organic Synthesis, vol. 1, Wiley and Sons, N.Y. (1967), p. 1220.

LEWIS GOTTS, Primary Examiner

R. J. SUYAT, Assistant Examiner